United States Patent
Ono

(10) Patent No.: US 6,692,390 B2
(45) Date of Patent: Feb. 17, 2004

(54) PLASTIC GUIDE FOR TRANSMISSION DEVICE

(75) Inventor: Osamu Ono, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 67 days.

(21) Appl. No.: 10/096,115

(22) Filed: Mar. 8, 2002

(65) Prior Publication Data

US 2002/0132688 A1 Sep. 19, 2002

(30) Foreign Application Priority Data

Mar. 13, 2001 (JP) .......................... 2001-071170

(51) Int. Cl.$^7$ ................................. F16H 7/08
(52) U.S. Cl. ........................ 474/111; 474/140
(58) Field of Search ................. 474/111, 140; 248/930

(56) References Cited

U.S. PATENT DOCUMENTS

| | | | | |
|---|---|---|---|---|
| 5,318,482 A | * | 6/1994 | Sato et al. | 474/111 |
| 5,853,341 A | * | 12/1998 | Wigsten | 474/140 |
| 2002/0077204 A1 | * | 6/2002 | Kumakura | 474/140 |

FOREIGN PATENT DOCUMENTS

| | | |
|---|---|---|
| JP | 07-083214 | 3/1995 |
| JP | 08254253 | 10/1996 |
| JP | 2818795 | 8/1998 |
| JP | 10-311395 | 11/1998 |

OTHER PUBLICATIONS

English Online Translation of JP 10–311395.*
English Online Translation of JP 08–254253.*

* cited by examiner

*Primary Examiner*—David A. Bucci
*Assistant Examiner*—Bradley J. VanPelt
(74) *Attorney, Agent, or Firm*—Dann, Dorfman, Herrell and Skillman, P.C.; Henry H. Skillman

(57) ABSTRACT

A plastic movable guide is disclosed wherein a reinforcing plate for reinforcing a guide body is simplified in shape, permitting easy assembly and prevention of disengagement. The movable guide is constituted by a guide body and a reinforcing plate fitted into the guide body. The guide body has a slit which receives the reinforcing plate which has a pair of recesses. A pair of windows are formed in the guide body to register with the reinforcing plate recesses. Each window has a tongue piece having a face which projects angularly into the slit and terminates in a retaining portion. When the reinforcing plate is advanced into the slit, the retaining portions of the tongue pieces are deflected out of the slit and when the plate is seated, the retaining portions are engaged in the recesses and retain the plate in the guide body.

7 Claims, 5 Drawing Sheets

PLASTIC GUIDE FOR TRANSMISSION DEVICE

BACKGROUND OF THE INVENTION

Field of the Invention

The present invention relates to a plastic guide such as a movable guide (a guide mounted rotatably on a single shaft, for example as a tensioner lever or a slipper) or a fixed guide (a guide used for example as a chain guide, a guide rail, or a belt guide) used in a transmission device which transmits power from a driving side to a driven side with use of a driving sprocket, a driven sprocket, and a chain entrained on those sprockets and adapted to travel circulatively or in a transmission device which transmits power from a driving side to a driven side with use of a driving pulley, a driven pulley, and a belt entrained on those pulleys and adapted to travel circulatively.

Generally, an engine or a drive unit is provided with a transmission device for the transmission of power using a chain or a belt. In the transmission device comprising a chain or a belt there is used a guide such as a movable guide or a fixed guide having a slipping function. The guide is mounted to a frame of an engine or a drive unit with mounting bolts or pins.

The movable guide for a transmission device comes into sliding contact with a circulating chain or belt to impart an appropriate tension thereto or prevent vibration and rolling of a travelling chain or belt. The fixed guide is used for preventing overstretching or overloosening of a chain or a belt when installed to a transmission device, or for preventing vibration and rolling of a travelling chain or belt, or for a mere guiding purpose.

In FIG. 7 there is illustrated a conventional plastic movable guide (tensioner lever) 100 which is used in a chain drive system. The movable guide 100 is formed integrally by molding a unitary synthetic resin material. The movable guide 100 is made up of a shoe 101 which comes into sliding contact with a travelling chain C, a vertical plate 102 disposed longitudinally on the back side of the shoe 101, a flange 103 provided along the lower edge of the vertical plate 102, and a boss 105 having a mounting hole 104 for mounting the movable guide to a housing of, for example, an engine or a drive unit. In the same figure, the numeral 102' denotes a reinforcing rib.

Since the conventional plastic movable guide 100 is formed integrally by molding a unitary synthetic resin material, it is difficult to attain and maintain all of a high level of sliding contact, wear resistance and strength characteristics required as a shoe. For example, if the movable guide 100 is formed as an unreinforced plastic movable guide superior in sliding contact and wear resistance, its mechanical strength will be poor, and if its cross-sectional size is made large to compensate for the deficiency in strength, the movable guide becomes thicker and larger in size, thus giving rise to the problem that the space occupied by the movable guide when installed to a housing of, for example, an engine or a drive unit increases.

As means for solving the above-mentioned problem there has been proposed a two-layer molded plastic guide obtained by making an unreinforced resin superior in wear resistance integral with a fiber-reinforced resin as a base by injection molding (Japanese Patent Publication No. 2818795), and also proposed is a plastic guide obtained by insert molding with use of an insert member as a core which insert member is obtained by the extrusion of a steel plate (Japanese Patent Laid Open No. 254253/1996). However, when producing these plastic guides by molding, the structures of the molds used are complicated and an increase of manufacturing cost results. Further, if two kinds of resin materials are rendered integral with each other or if a metallic insert member is embedded as a core, it is impossible to absorb a change in shape caused by a difference thermal expansion coefficient, thus giving rise to the problem that the guide itself is deformed or damaged.

As another means for solution there has been proposed such a plastic movable guide 110 as shown in FIG. 8, in which a slit 117 having an opening in one side face thereof is formed in a shoe 111 of a plastic guide body which is formed integrally by molding a synthetic resin, and a reinforcing plate 118 such as a steel or iron plate is fitted in the slit 117. However, since the reinforcing plate 118 is provided in parallel with a sliding contact surface of the shoe 111 which is curved, the movable guide 110 is small in section modulus and is inferior in point of rigidity and strength. Besides, the mounting hole 114 formed in the boss 115 and the reinforcing plate 118 are spaced apart from each other and cannot be coupled together, so that the vicinity of the boss is inferior in strength. Further, since the reinforcing plate 118 is merely fitted in the opening of the slit, there also has been a problem such that the reinforcing plate is disengaged from the shoe 111 due to twisting or vibration of the shoe 111. Additionally, in the case where the reinforcing plate 118 is a metallic plate such as a steel plate, it is necessary for a metallic plate after blanking to go through a step of curving to conform to the curved surface of the shoe 111.

SUMMARY OF THE INVENTION

The present invention has been accomplished for solving the above-mentioned problems and it is an object of the invention to provide a plastic guide for a transmission device. In this plastic guide, the body of a movable or fixed guide is formed of resin in a simple shape and a reinforcing plate for reinforcing the guide body is also formed in a simple shape to permit easy assembly and prevent disengagement, and the reinforcing plate is disposed so that the section modulus of the plastic guide becomes large, thereby enhancing the flexural rigidity and strength of the guide to prevent an increase in sectional size and overall structure, with consequent reduction of weight, whereby it is intended to prevent an increase of the space occupied by the guide when mounted to the frame of an engine or a drive unit.

For achieving the above-mentioned object, in one aspect of the present invention there is provided a plastic guide for a transmission device, comprising a guide body made of a synthetic resin and a metallic reinforcing plate, the guide body comprising a shoe with whose surface a travelling chain, belt, or the like comes into sliding contact and a vertical plate disposed longitudinally on a back side of the shoe, the vertical plate having a slit formed longitudinally thereof and opening in an end portion thereof, the metallic reinforcing plate being fitted in the slit, wherein at least one window is formed in the vertical plate, a tongue piece is formed in the window, the tongue piece extending in a direction in which the reinforcing plate is fitted in the slit, the tongue piece having an expanded face for advance into the slit and also having a truncated face at an end portion thereof, and at least one concave portion is formed in the reinforcing plate and is engaged with the truncated face of the tongue piece.

In the present invention, the resin which constitutes the plastic guide body is not specially limited, but what is called an engineering plastic material superior in both wear resistance and lubricity is preferred so that the surface of sliding contact with a chain or a belt can fulfill the function required of the shoe. As the case may be, a fiber-reinforced resin may be used. The material of the reinforcing plate is not specially limited, either. As preferred examples are mentioned ferrous metals, nonferrous metals such as aluminum, magnesium, and titanium, engineering plastics superior in flexural rigidity and strength, and fiber-reinforced plastics.

Since the guide of the present invention is a plastic guide wherein the guide body provided with both shoe and vertical plate is formed integrally by molding a synthetic resin, the guide itself possesses a slipping function. Besides, a slit which opens in an end portion of the vertical plate is formed longitudinally of the vertical plate and the reinforcing plate is fitted in the slit. It follows that the reinforcing plate is provided longitudinally of the shoe, thus affording high flexural rigidity and strength. Moreover, since the reinforcing plate is fitted in the slit, the reinforcing plate can be mounted easily to the guide body, so that the manufacture of the plastic guide becomes easy and it becomes possible to automate the assembling work.

In the present invention, moreover, a tongue piece extending in the fitted direction of the reinforcing plate is formed in the window, the tongue piece having an expanded face for advancing into the slit and also having a truncated face at an end portion thereof. On the other hand, at least one recess is formed in the reinforcing plate. As the reinforcing plate is fitted into the slit, it comes into contact with the expanded face of the tongue piece. With the expanded face advanced into the slit, when the reinforcing plate is fitted into the slit, the tongue piece is deformed so as to be excluded from the slit. The tongue piece is elongated so as to facilitate the deformation.

As the reinforcing plate further advances into the slit, the recess formed therein arrives at the end portion of the tongue piece. When the recess of the reinforcing plate goes over the end portion of the tongue piece, the tongue pieces reverts to its original posture elastically and its truncated face engages the window of the reinforcing plate. In this state, the reinforcing plate is prevented from moving in a direction of dislodgment from the slit and is held positively in the guide body.

DETAILED DESCRIPTION OF A PREFERRED EMBODIMENT

Figure 1:
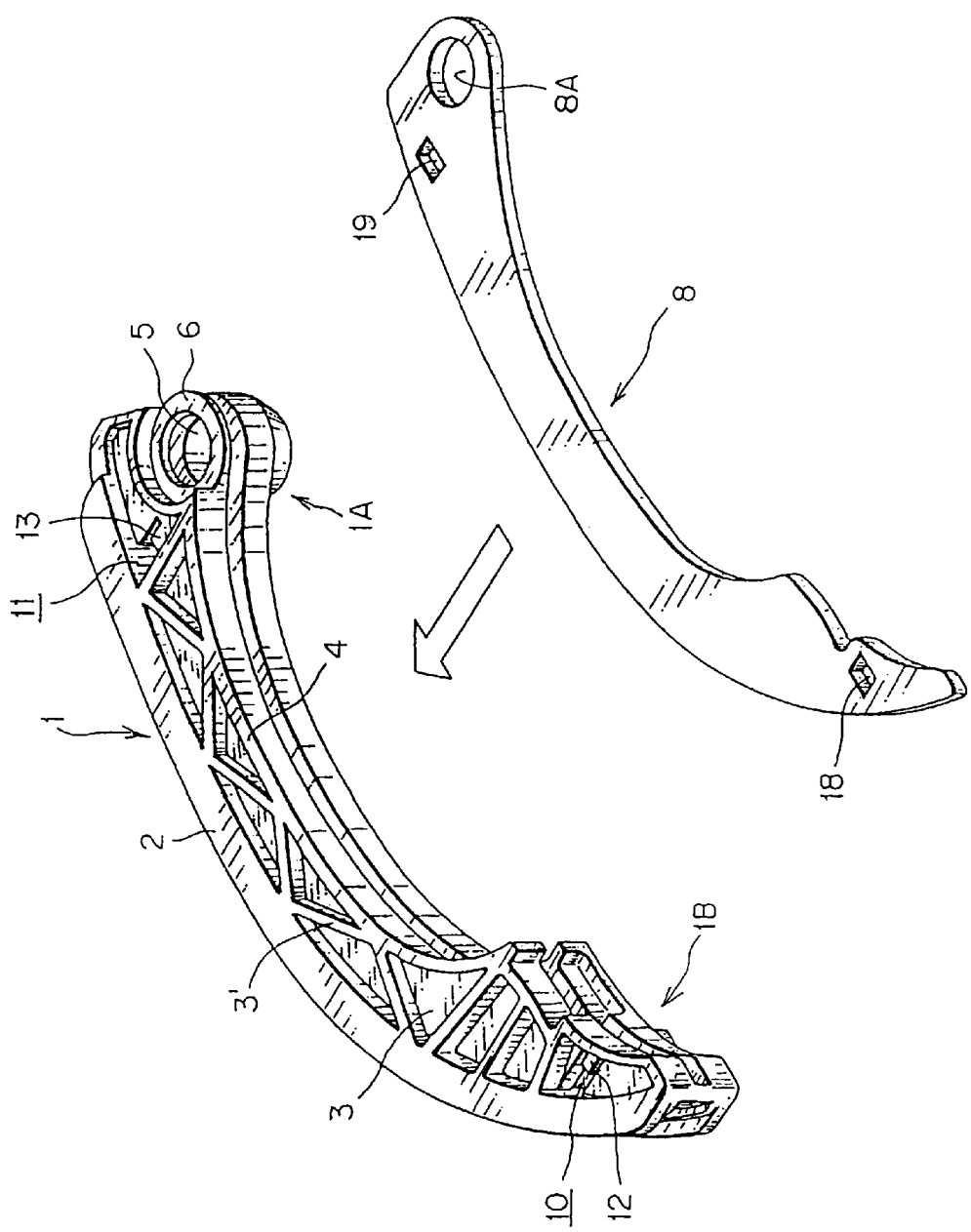
FIG. 1 illustrates in what state a movable guide according to a first embodiment of the present invention is assembled.
Figure 2:
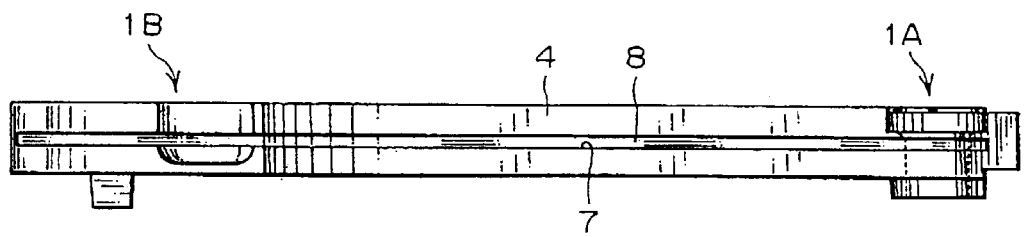
FIG. 2 is a plan view of a bottom side of the movable guide.

An embodiment of the present invention will be described hereinunder with reference to FIGS. 1 to 6. FIG. 1 illustrates in what state a plastic movable guide to be used in a chain drive system is assembled. As shown in the same figure, a reinforcing plate 8 is fitted into a guide body 1 to constitute the movable guide.

The guide body 1, which is formed integrally by molding a synthetic resin, is made up of a shoe 2 having on a surface side a slide surface with which a travelling chain comes into sliding contact, a vertical plate 3 provided on a back side of the shoe 2 vertically and extending in the longitudinal direction, a flange 4 formed at an end portion of the vertical plate 3, and a boss 6 having a mounting hole 5 for mounting to a frame of, for example, an engine or a drive unit. The reinforcing plate 3 has reinforcing ribs 3' and a slit 7 which is open longitudinally in a side end portion of the flange 4.

Figure 3:
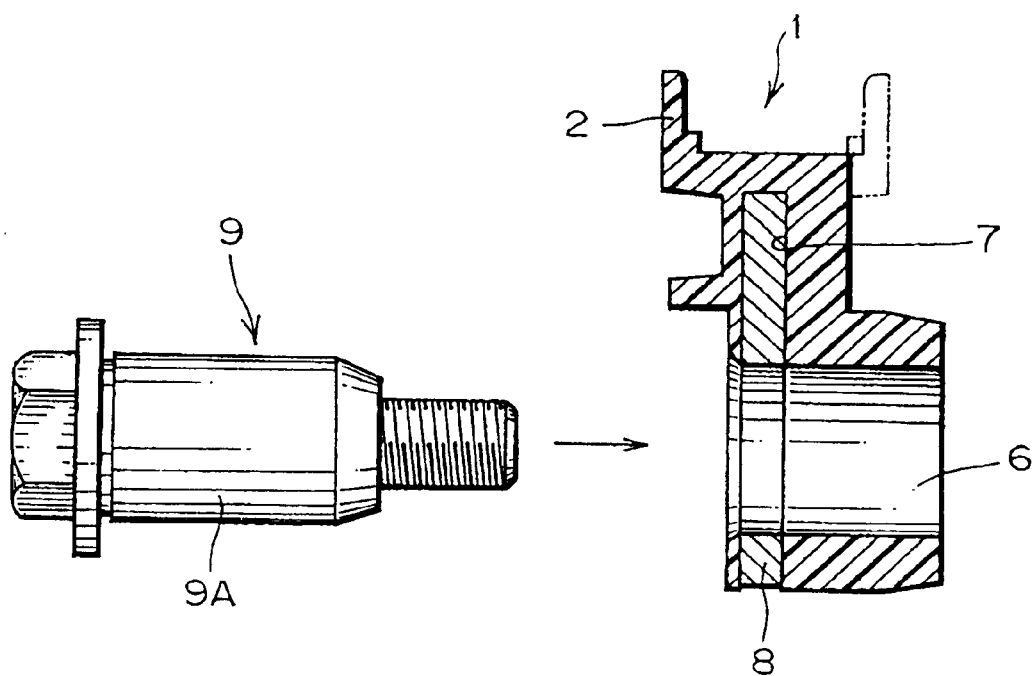
FIG. 3 is a sectional view of a boss portion shown in FIG. 1.
Figure 4:
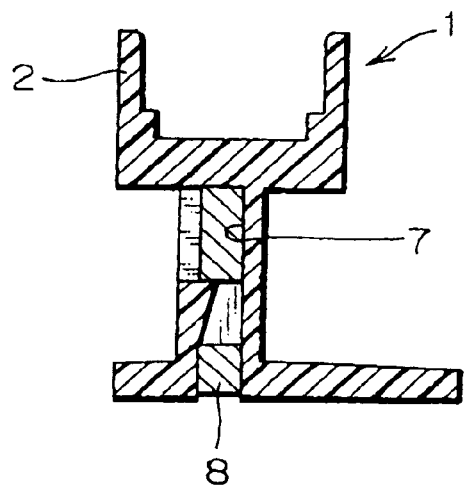
FIG. 4 is a sectional view of a front end portion shown in FIG. 1.
Figure 5:
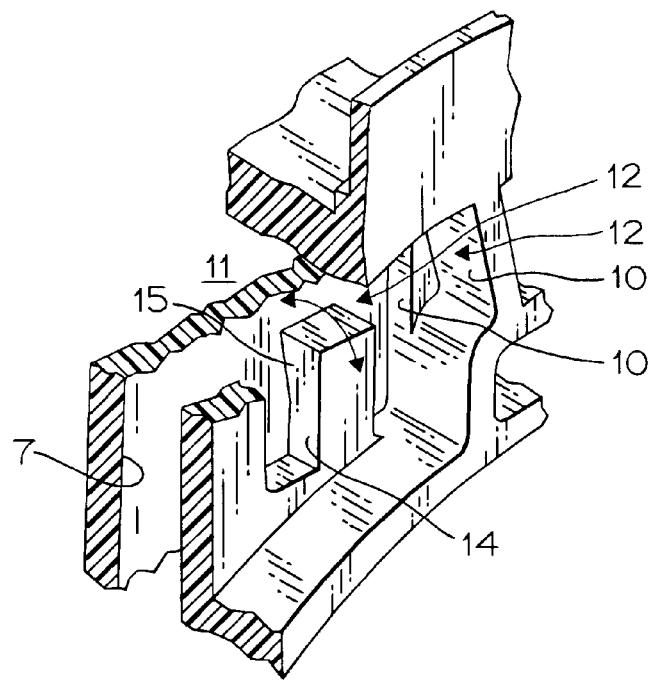
FIG. 5 is an enlarged fragmentary perspective view of a window portion shown in FIG. 1.
Figure 6:
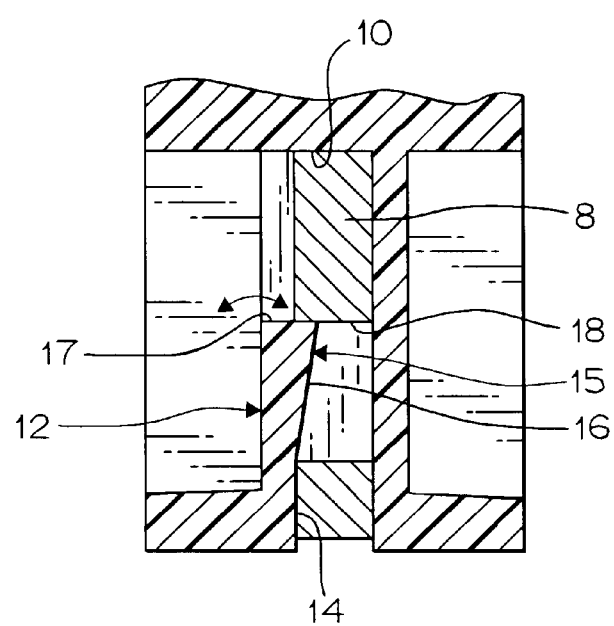
FIG. 6 is an enlarged sectional view of a tongue piece.
Figure 7:
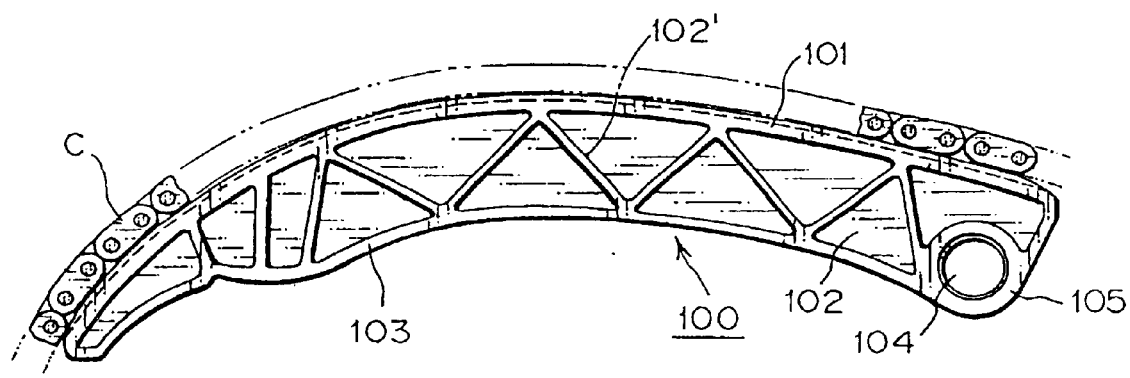
FIG. 7 is a front view of a conventional movable guide.
Figure 8:
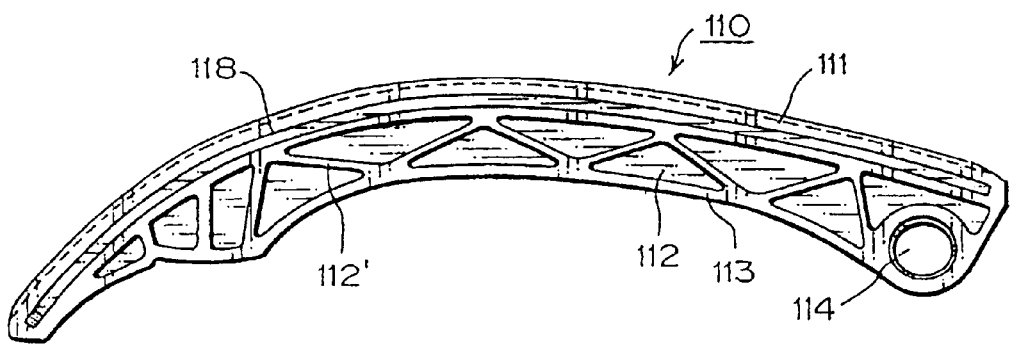
FIG. 8 is a front view of another conventional movable guide.

As is seen from FIGS. 3 and 4, the slit 7 is formed during molding in the vertical plate 3 perpendicular to the shoe 2 in the chain travelling direction. A reinforcing plate 8 having a bolt insertion hole 8A is fitted into the slit 7 from the side opposite to the shoe 2 to reinforce the guide body 1. Such a bolt (shoulder bolt) 9 having a pivot portion 9A as shown in FIG. 3 is inserted through the plastic movable guide with the reinforcing plate 8 fitted therein into a side wall of the frame of an engine or a drive unit or a pin provided on the frame side is inserted through the guide and both guide and housing are jointly fastened. At this time, with the bolt 9, the reinforcing plate 8 is prevented from disengagement on one end side 1A.

Further, in this embodiment, windows 10 and 11 are formed in the vertical plate 3. In a thin plate portion exclusive of the reinforcing ribs 3 there is formed a window in at least one position. In this embodiment, two windows 10 and 11 are formed respectively on a left-hand free end side in FIG. 1 and on a right-hand pivotal end side in the same figure. It suffices for both windows 10 and 11 to be formed in one side of the vertical plate 3, but may be formed on both sides of the vertical plate.

Resilient tongue pieces 12 and 13 extending in the direction of arrow in FIG. 1, i.e., in the fitted direction of the reinforcing plate 8, are formed in the windows 10 and 11, respectively. As shown in detail in FIGS. 4 to 6, the tongue piece 12 extends from a bottom of the window 10 toward the shoe 2. The tongue piece 12 comprises a base end portion 14 having the same thickness as the wall thickness of the vertical plate 3 and a retaining portion 15 formed on a front end side. The retaining portion 15 has an expanded face 16 for advance into the slit 7 and a truncated face 17 which is contiguous to the expanded face 16 at an end portion of the tongue piece 12. The truncated face 17 is formed perpendicularly to the direction in which the reinforcing plate 8 is fitted. In the window 11, the tongue piece 13 has a retaining portion with an expanded face and truncated face identical to the portion 15 and the faces 16 and 17.

On the other hand, recesses or concave portions 18 and 19 are formed in the reinforcing plate 8 in positions corresponding to the windows 12 and 13 respectively. Although the recesses 18 and 19 in this embodiment comprise windows which extend from the front to the back through the reinforcing plate, they may be formed in a mere depression shape. In this embodiment, the recesses 18 and 19 are rectangular and their sides running in the longitudinal direction of the guide are each longer than the width of each of the tongue pieces 12 and 13, while their sides running in the fitted direction of the reinforcing plate are each longer than the height of the retaining portion 15 of each tongue piece.

The tongue pieces 12 and 13 are constricted and arranged to be deflected when the plate 3 is pressed into the slit 7. As shown in FIG. 1, when the reinforcing plate 8 is fitted into the slit 7, the reinforcing plate comes into contact with the expanded face of the retaining portion of each of tongue pieces 12 and 13, causing the tongue pieces 12 and 13 to be deflected in a direction away from the slit 7. Since the tongue piece 12 has the base end portion 14 which is as thin as the thin plate portion of the vertical plate 3, and the tongue piece 13 has an identical end portion, the tongue pieces are deflected by a mere press-fit of the reinforcing plate 8 with a slight force.

As the reinforcing plate 8 is further press-fitted, an upper surface opposed to a bottom of the reinforcing plate 8 goes over the truncated face 17. At this time, the tongue pieces 12 and 13 revert to their original postures by virtue of elasticity. As noted above, since the sides of the recesses in the fitted direction of the reinforcing plate are each longer than the height of the retaining portion of each tongue piece, the tongue pieces 12 and 13 which have reverted to their original postures by virtue of elasticity are received within the recesses 18 and 19. The truncated faces of the tongue pieces are engaged with upper surfaces of the concave portions 18 and 19 to prevent dislodgment of the reinforcing plate 8 from the slit 7.

In the present invention, as set forth above, since the guide body comprising the shoe and the vertical plate provided vertically on the back side of the shoe is formed integrally by molding a synthetic resin, the guide body possesses a slipping function and it becomes no longer necessary to provide any separate shoe member. As a result, it is possible to prevent an increase in the number of components and the number of manufacturing steps. Besides, since a slit which opens in an end portion of the vertical plate of the plastic guide body is formed longitudinally of the vertical plate and the reinforcing plate is fitted in the slit, it is possible to dispose the reinforcing plate so that the section modulus of the plastic guide becomes large.

Since the reinforcing plate is fitted in the vertical plate of the guide body longitudinally of the shoe, the section modulus of the plastic guide can be large and it is possible to improve the flexural rigidity and strength, as compared with the case where a reinforcing plate is disposed in parallel with the sliding contact surface of the shoe. As a result, it is possible to use a smaller cross-sectional size and to reduce the size of the entire structure and hence possible to increase the strength as compared with another reinforcing plate of the same mass. Moreover, the plastic guide can be more reduced in weight than other guides, assuming that both are about the same in section modulus. Consequently, it is possible to reduce the thickness of the guide body, and also when mounted to the frame of an engine or a drive unit, the space occupied by the guide body can be reduced.

After the guide body is formed integrally by molding a synthetic resin, all that is required is merely fitting the reinforcing plate into the slit formed in the vertical plate of the plastic guide body, both guide body and reinforcing plate can be formed in a simple shape, and in the case where the reinforcing plate is a metallic plate, it can be fabricated by only press punching, not requiring a bending step, which is advantageous in point of precision and manufacturing cost. Moreover, since the only operation required is fitting the reinforcing plate into the slit formed in the guide body, it is not necessary to use any other part, thus facilitating the assembly and fabrication of the plastic guide, with consequent possibility of automating the assembling work.

Since the reinforcing plate is merely fitted in the slit and is not positioned in the longitudinal direction, even if there is a slight difference in thermal expansion coefficient between the plastic guide body and the reinforcing plate, both assume a mutually free state in the longitudinal direction, whereby morphological deformations are absorbed and thus it is possible to prevent deformation and damage of the plastic guide.

Further, in the present invention, tongue pieces are formed respectively in the windows, the tongue pieces extending in the direction in which the reinforcing plate is fitted and each having an expanded face for advance into the slit and also having a truncated face at an end portion thereof. On the other hand, at least one concave portion is formed in the reinforcing plate. In the course of the reinforcing plate being fitted into the slit, the tongue pieces are deformed so as to be excluded from the slit by the action of the expanded faces of the tongue pieces. Upon subsequent arrival of the concave portions the truncated faces come into engagement with the concave portions.

Thus, by forming the tongue pieces in a shape elongated in the fitted direction of the reinforcing plate, the tongue pieces become easier to be deformed upon contact of the reinforcing plate with the expanded faces of the tongue pieces. Further, when the truncated faces are put in engagement with the recessed portions, the reinforcing plate is prevented from moving in the direction of dislodgment from the slit and is held in the guide body even under, for example, vibration exerted on the guide. As compared with a mere projection as in the prior art, such expanded face and truncated face permit a deeper penetration into the reinforcing plate, so that the reinforcing plate is held in the guide positively.

What is claimed is:

1. A plastic guide for a transmission device having a driving device, a driven device and a traveling run extending between said devices, comprising:

a guide body made of a synthetic resin, said guide body comprising a shoe having a front surface for sliding contact with said traveling run, said body extending longitudinally in back of said front surface, said body having a slit formed longitudinally thereof, said slit having an opening in one portion of said body;

a separate reinforcing plate operable to be advanced into a home position in said slit through said opening, wherein at least one window is formed in said body, said window having a first edge adjacent said opening and a second edge spaced from said first edge away from said opening, a tongue piece extending from said first edge toward said second edge and terminating in a retaining portion, said retaining portion operable to project into said slit, and at least one recess in said reinforcing plate operable to register with said at least one window when in said home position, the advance of said plate into said slit deflecting said tongue piece and engaging said retaining portion into said recess.

2. A plastic guide according to claim 1 wherein said tongue piece is integral with said synthetic resin body and is elastically deflected by the advance of the plate into the slit.

3. A plastic guide according to claim 1 wherein said tongue piece has a thickness corresponding to the thickness of said first edge where it adjoins said first edge and has an increased thickness where it terminates in said retaining portion.

4. A plastic guide according to claim 1 wherein said separate reinforcing plate has flexural rigidity and strength superior to said synthetic resin.

5. A plastic guide according to claim 4 wherein said reinforcing plate is a flat metallic plate having at least one press-punched recess.

6. A plastic guide according to claim 1 wherein said reinforcing plate has two recesses, one adjacent each end of the plate, and said body has two windows respectively operable to register with said recesses when said plate is in its home position, each window having an elongated tongue piece.

7. A plastic guide according to claim 1 wherein said synthetic resin is an engineering plastic which is fiber-reinforced.

* * * * *